US012164518B2

(12) United States Patent
Karlberg et al.

(10) Patent No.: US 12,164,518 B2
(45) Date of Patent: Dec. 10, 2024

(54) DISTRIBUTION OF FEDERATED GRAPH QUERIES USING SCHEMAS

(71) Applicant: Microsoft Technology Licensing, LLC, Redmond, WA (US)

(72) Inventors: Jan-Ove Almli Karlberg, Tromso (NO); Theodoros Gkountouvas, Tromso (NO); Iqra Ali, Tromso (NO); Anders Tungeland Gjerdrum, Tromso (NO); Anthony Acquah, Oslo (NO); Kai-Marius Pedersen, Tromso (NO); Tor Kreutzer, Tromso (NO); Ronny Jensen, Tromso (NO)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/150,789

(22) Filed: Jan. 5, 2023

(65) Prior Publication Data

US 2024/0143590 A1     May 2, 2024

Related U.S. Application Data

(60) Provisional application No. 63/381,511, filed on Oct. 28, 2022.

(51) Int. Cl.
*G06F 17/30*     (2006.01)
*G06F 16/2453*   (2019.01)
(Continued)

(52) U.S. Cl.
CPC ...... *G06F 16/24545* (2019.01); *G06F 16/256* (2019.01); *G06F 16/9024* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 6,272,488 B1 * 8/2001 Chang ............... G06F 16/256
                                              707/999.102
7,953,723 B1 * 5/2011 Dutton ............... G06F 16/951
                                              707/707

(Continued)

FOREIGN PATENT DOCUMENTS

CN          114153987 A       3/2022

OTHER PUBLICATIONS

He, et al., "Distributed Real-Time Knowledge Graph Serving", In Proceedings of International Conference on Big Data and Smart Computing (BIGCOMP), Feb. 9, 2015, 5 Pages.

(Continued)

*Primary Examiner* — Hung D Le
(74) *Attorney, Agent, or Firm* — Barta Jones, PLLC

(57) ABSTRACT

Example solutions for performing federated graph queries use schemas and include: generating a logical graph using a query input and generating a physical plan using a query planning schema for double-nested loops, the outer loop for each permutation of data stores in a set of data stores, and the inner loop for each data store—ceasing when the logical graph has been fully consumed. A query cost is determined for each of the permutations, and a physical plan is selected based on the query cost, for example minimizing the query cost, and the query is executed based on the selected physical plan. The cost may be determined based on a weighted combination of factors such as freshness of the data, latency, power consumption, environmental impact (e.g., carbon footprint), energy efficiency, and network burden.

20 Claims, 13 Drawing Sheets

(51) Int. Cl.
*G06F 16/25* (2019.01)
*G06F 16/901* (2019.01)

(56) References Cited

U.S. PATENT DOCUMENTS

| | | | |
|---|---|---|---|
| 8,229,963 B2 | 7/2012 | Fields et al. | |
| 8,412,746 B2 | 4/2013 | Fox et al. | |
| 9,053,210 B2 | 6/2015 | Elnikety et al. | |
| 9,335,885 B1* | 5/2016 | Brocato | G06F 3/0489 |
| 9,870,393 B2* | 1/2018 | Chen | G06F 16/24544 |
| 10,102,258 B2 | 10/2018 | Jacob et al. | |
| 10,303,688 B1 | 5/2019 | Sirin | |
| 10,545,982 B1* | 1/2020 | Kramer | G06F 16/27 |
| 10,990,595 B2 | 4/2021 | Roth et al. | |
| 11,157,467 B2 | 10/2021 | Lei et al. | |
| 11,893,015 B2* | 2/2024 | Shen | G06F 16/256 |
| 2002/0026443 A1* | 2/2002 | Chang | G06F 16/256 |
| 2007/0067274 A1* | 3/2007 | Han | G06F 16/2456 |
| 2007/0226186 A1* | 9/2007 | Ewen | G06F 16/24542 |
| 2010/0131490 A1* | 5/2010 | Lamb | G06F 16/24542 707/719 |
| 2012/0166421 A1* | 6/2012 | Cammert | G06F 16/2425 707/765 |
| 2012/0166469 A1* | 6/2012 | Cammert | G06F 16/24568 707/769 |
| 2012/0284255 A1 | 11/2012 | Schechter et al. | |
| 2013/0086039 A1* | 4/2013 | Salch | G06F 16/2455 707/E17.131 |
| 2013/0191371 A1* | 7/2013 | Poznanski | G06F 16/951 707/E17.014 |
| 2013/0290292 A1 | 10/2013 | Weyerhaeuser | |
| 2013/0339385 A1 | 12/2013 | Abrams | |
| 2014/0156633 A1* | 6/2014 | Duan | G06F 16/9024 707/713 |
| 2014/0304251 A1 | 10/2014 | Bornea | |
| 2015/0149440 A1* | 5/2015 | Bornea | G06F 16/2453 707/719 |
| 2016/0034530 A1* | 2/2016 | Nguyen | G06F 16/24542 707/719 |
| 2016/0292167 A1 | 10/2016 | Tran | |
| 2017/0139991 A1* | 5/2017 | Teletia | G06F 16/9024 |
| 2017/0286526 A1* | 10/2017 | Bar-Or | G06F 8/34 |
| 2017/0364539 A1* | 12/2017 | Jacob | G06F 16/24547 |
| 2018/0039673 A1 | 2/2018 | Chen et al. | |
| 2019/0050459 A1* | 2/2019 | Griffith | G06F 16/248 |
| 2019/0384844 A1* | 12/2019 | Ding | G06F 16/24539 |
| 2020/0272627 A1* | 8/2020 | Halterman | G06F 16/24549 |
| 2020/0285643 A1* | 9/2020 | Kadiam | G06F 16/24542 |
| 2020/0320094 A1* | 10/2020 | Ouyang | G06F 16/256 |
| 2020/0379998 A1 | 12/2020 | Dixit | |
| 2021/0216590 A1* | 7/2021 | Delamare | G06F 16/2454 |
| 2021/0263929 A1* | 8/2021 | Chen | G06F 16/24539 |
| 2022/0050840 A1* | 2/2022 | Parravicini | G06N 5/025 |
| 2022/0269691 A1* | 8/2022 | Liu | G06F 9/54 |
| 2022/0277006 A1* | 9/2022 | O'Krafka | G06F 16/24537 |
| 2022/0335068 A1* | 10/2022 | Yue | G06F 16/285 |
| 2023/0127572 A1* | 4/2023 | Jacob | G06F 21/6227 707/755 |
| 2023/0315731 A1* | 10/2023 | Xu | G06F 16/24545 707/714 |
| 2023/0359619 A1* | 11/2023 | Sharan | G06F 16/283 |

OTHER PUBLICATIONS

Joshi, Omkar, "Implementing Federated GraphQL Microservices using Apollo Federation", Retrieved From: https://web.archive.org/web/20211124065421/https://www.velotio.com/engineering-blog/implementing-federated-graphql-microservices-using-apollo-federation, Nov. 24, 2021, pp. 1-28.

Das, et al., "Plan Before You Execute: A Cost-Based Query Optimizer for Attributed Graph Databases," 18th International Conference, IT Laboratory Department of Computer Science, Aug. 6, 2016, pp. 314-328.

Das, et al., "Query processing on large graphs: Approaches to scalability and response time trade offs," Data & knowledge engineering, vol. 126, Sep. 2, 2019, 16 pages.

Endris, et al., "Chapter 5 Federated Query Processing," Knowledge Graphs and Big Data Processing, Springer International Publishing Chain, vol. 12072, Jul. 16, 2020 pp. 73-86.

Heling, et al., "A Framework for Federated SPARQL Query Processing over Heterogeneous Linked Data Fragments," Germany, Feb. 26, 2021, 14 Pages.

International Search Report and Written Opinion received for PCT Application No. PCT/US23/032817, Dec. 14, 2023, 18 pages.

Oguz, et al., "Federated query processing on linked data: a qualitative survey and open challenges," Knowledge Engineering Review, vol. 30, Issue No. 5, Oct. 30, 2015, pp. 545-563.

Ozsu, et al., "Chapter 7: Database Integration-Multidata base Systems," Principles of Distributed Database Systems, 3 December, Springer International Publishing, Cham, pp. 281-347.

Stunkel, et al., "GraphQL Federation: A Model-Based Approach," Journal of Object Technology, vol. 19, Issue No. 2, Jul. 1, 2020, p. 21.

Wu, et al., "Fast and Accurate Optimizer for Query Processing over Knowledge Graphs," Proceedings of the 6th annual ACM, Institute of Parallel and Distributed System, Nov. 1, 2021, pp. 503-517.

* cited by examiner

| NODE SUB-SCHEMA | 121 |
|---|---|
| Field Name | Description |
| ID | The principal ID (external ID) of the node |
| Properties | A set of properties available on the node that may be referenced to express filtering, ordering, or other parameters, or returned in the response payload |
| Provenance | Describes the origin and availability of the node, such as in which storage systems the node is found, which should be considered the authoritative source, which are considered caches, and/or freshness information |

| RELATIONSHIP SUB-SCHEMA | 122 |
|---|---|
| Source Node ID | The ID of the node from which the relationship is outbound |
| Target Node ID | The ID of the node to which the relationship is inbound |
| Properties | A set of available relationship properties – similar uses as node properties |
| Type | The type of relationship |

| PROPERTY SUB-SCHEMA | 123 |
|---|---|
| Property Name | A string that uniquely identifies the property in the global schema |
| Type | The type of the property, such as string, integer, byte |
| Data Classification | The classification of the property, indicating sensitivity or dissemination limits |
| Provenance | Describes the origin and availability of the property, such as in which storage systems the property is found, which should be considered the authoritative source, which are considered caches, and/or freshness information |

| DATA STORE SUB-SCHEMA | 124 |
|---|---|
| Store ID | A unique identifier of the data stpre |
| Store Name | A label for the data store intended for human interpretation |
| Capabilities | Identification of query search capabilities supported by the data store |

| PRIMARY ID SUB-SCHEMA | 125 |
|---|---|
| Data Classification | The classification of this ID, indicating sensitivity or dissemination limits |
| Value | A unique identifier of an entity within the global arrangement |

| REFERENCE ID SUB-SCHEMA | 126 |
|---|---|
| Data Classification | The classification of this ID, indicating sensitivity or dissemination limits |
| Region ID | An identification of the logical region in which an entity is located |
| System ID | An identification of the target system in which an entity is located |
| Value | A unique identifier within a specific target system and region pair |

FIG. 5A

QUERY: MATCH (user) WHERE id(user) = "userId" RETURN user.Name, user.EmailAddress

SCHEMA:

| Property Name | Type | DataClassification | Provenance |
|---|---|---|---|
| User.Name | String | EU protected PII | [{"StoreName":"StoreA", "AuthoritativeSource": "true"}, {"StoreName":"StoreB", "AuthoritativeSource": "false"}] |
| User.EmailAddress | String | EU protected PII | [{"StoreName":"StoreA", "AuthoritativeSource": "true"}] |

FIG. 5B

QUERY: MATCH (user)-[r:Messaged]->(friend) WHERE id(user) = "userId" RETURN user.Name, friend.Name

SCHEMA:

| Property Name | Type | Properties | Provenance |
|---|---|---|---|
| User.Name | String | EU protected PII | [{"StoreName":"StoreA", "AuthoritativeSource": "true"}, {"StoreName":"StoreB", "AuthoritativeSource": "false"}] |

| SourceNodeID | TargetNodeID | Properties | DefaultSortValue | Type | Provenance |
|---|---|---|---|---|---|
| User.ID | User.ID | ["Message.PropA", "Message.PropB", "MessageTime"] | MessageTime | Messaged | [{"StoreName":"StoreB", "IsBackingStore": "true"}] |

FIG. 5C

QUERY:  MATCH (user)-[r:Modified]->(document)
WHERE id(user) = "userId" AND document.Title = "Status Update"
RETURN user.Name, document.Title

SCHEMA:

| Property Name | Type | DataClassification | Properties | Provenance |
|---|---|---|---|---|
| User.Name | String | EU protected PII | | [{"StoreName":"StoreA", "AuthoritativeSource": "true"}, {"StoreName":"StoreB", "AuthoritativeSource": "false"}] |
| Document.Title | String | Customer Content | | [{"StoreName":"StoreA", "AuthoritativeSource": "true"}, {"StoreName":"StoreB", "AuthoritativeSource": "false"}] |

| SourceNodeID | TargetNodeID | Properties | DefaultSortValue | Type | Provenance |
|---|---|---|---|---|---|
| User.ID | User.ID | ["Message.PropA", "Message.PropB", "MessageTime"] | MessageTime | Modified | [{"StoreName":"StoreA", "IsBackingStore": "false"}, {"StoreName":"StoreB", "IsBackingStore": "true"}] |

| StoreID | StoreName | Freshness | Capabilities |
|---|---|---|---|
| GUID_A | StoreA | < 5 minutes | ["NodeLookupById", "EdgeTraversal"] |
| GUID_B | StoreB | < 24 hours | ["NodeLookupById", "EdgeTraversal", "LookupNodeByPropertySearchExactMatch"] |

QUERY: MATCH (user)-[r:Modified]->(document)
WHERE id(user) = "userId" AND document.Title = "Status Update"
RETURN user.Name, document.Title

SCHEMA:

| Property Name | Type | DataClassification | Provenance |
|---|---|---|---|
| User.Name | String | EU protected PII | [{"StoreName":"StoreA", "AuthoritativeSource": "true"}, {"StoreName":"StoreB", "AuthoritativeSource": "false"}] |
| Document.Title | String | Customer Content | [{"StoreName":"StoreA", "AuthoritativeSource": "true"}] |

| SourceNodeID | TargetNodeID | Properties | DefaultSortValue | Type | Provenance |
|---|---|---|---|---|---|
| User.ID | User.ID | ["Message.PropA", "Message.PropB", "MessageTime"] | MessageTime | Modified | [{"StoreName":"StoreA", "IsBackingStore":"false"}, {"StoreName":"StoreB", "IsBackingStore":"true"}] |

| StoreID | StoreName | Freshness | Capabilities |
|---|---|---|---|
| GUID_A | StoreA | < 5 minutes | ["NodeLookupById", "EdgeTraversal", "LookupNodeByPropertySearchExactMatch"] |
| GUID_B | StoreB | < 24 hours | ["NodeLookupById", "EdgeTraversal", "LookupNodeByPropertySearchExactMatch"] |

QUERY: MATCH (user) WHERE id(user) = "userId" RETURN user.Name
SCHEMA:

| Property Name | Type | DataClassification | Provenance |
|---|---|---|---|
| User.Name | String | EU protected PII | [{"StoreName":"StoreA", "AuthoritativeSource": "true"}, {"StoreName":"StoreB", "AuthoritativeSource": "false"}] |

| StoreID | StoreName | Freshness | Capabilities |
|---|---|---|---|
| GUID_A | StoreA | < 5 minutes | ["NodeLookupById"] |
| GUID_B | StoreB | < 24 hours | ["NodeLookupById"] |

QUERY: MATCH (user) WHERE id(user) = "userId" RETURN user.Name
SCHEMA:

| Property Name | Type | DataClassification | Provenance |
|---|---|---|---|
| User.Name | String | EU protected PII | [{"StoreName":"StoreA", "AuthoritativeSource": "true"}, {"StoreName":"StoreB", "AuthoritativeSource": "false"}] |

| StoreID | StoreName | Freshness | Observed Latency | Capabilities |
|---|---|---|---|---|
| GUID_A | StoreA | < 5 minutes | 250ms average | ["NodeLookupById"] |
| GUID_B | StoreB | < 24 hours | 30ms average | ["NodeLookupById"] |

DISTRIBUTION OF FEDERATED GRAPH QUERIES USING SCHEMAS

CROSS REFERENCE TO RELATED APPLICATION

This application claims the benefit of U.S. Provisional Patent Application Ser. No. 63/381,511 filed on Oct. 28, 2022 and entitled "Distribution of Federated Graph Queries Using Schemas", which is hereby incorporated by reference in its entirety for all intents and purposes.

BACKGROUND

A graph abstraction allows for reasoning over connected data, however in many recent data storage arrangements, data is often distributed across multiple data stores that are hosted on differing physical storage systems and the data is connected only semantically. These different physical storage systems may provide their hosted data stores with widely different capabilities and characteristics. While there may be overlap in the data itself that is stored in the different data stores, the general case is that a data query may need to span multiple data stores in many scenarios.

Many of the challenges related to the distribution of data across multiple heterogeneous data stores may be solved by consolidating and collocating data into a centralized data repository. However, this approach is computationally costly in terms of providing the necessary capacity for the centralized data repository and network bandwidth for data replication, and also introduces latency delays. Thus, this approach suffers from lack of scalability.

SUMMARY

The disclosed examples are described in detail below with reference to the accompanying drawing figures listed below. The following summary is provided to illustrate some examples disclosed herein. It following, in the sequence, a reference frame of a reference frame set is not meant, however, to limit all examples to any particular configuration or sequence of operations.

Example solutions for performing federated graph queries use schemas and include: generating a logical graph using a query input and generating a physical plan using a query planning schema for double-nested loops, the outer loop for each permutation of data stores in a set of data stores, and the inner loop for each data store—ceasing when the logical graph has been fully consumed. A query cost is determined for each of the permutations, and a physical plan is selected based on the query cost, for example minimizing the query cost, and the query is executed based on the selected physical plan. The cost may be determined based on a weighted combination of factors such as freshness of the data, latency, power consumption, environmental impact (e.g., carbon footprint), energy efficiency, and network burden.

BRIEF DESCRIPTION OF THE DRAWINGS

The disclosed examples are described in detail below with reference to the accompanying drawing figures listed below:

FIGS. 3A-3D illustrate exemplary sub-schema that may be used with example architectures, such as the architecture of FIG. 1;

FIGS. 4A and 4B illustrate exemplary sub-schema that may be used with example architectures, such as the architecture of FIG. 1;

FIGS. 5A-5F illustrate example queries and schema details that may be encountered when using example architectures, such as the architecture of FIG. 1;

Corresponding reference characters indicate corresponding parts throughout the drawings.

DETAILED DESCRIPTION

Figure 1:
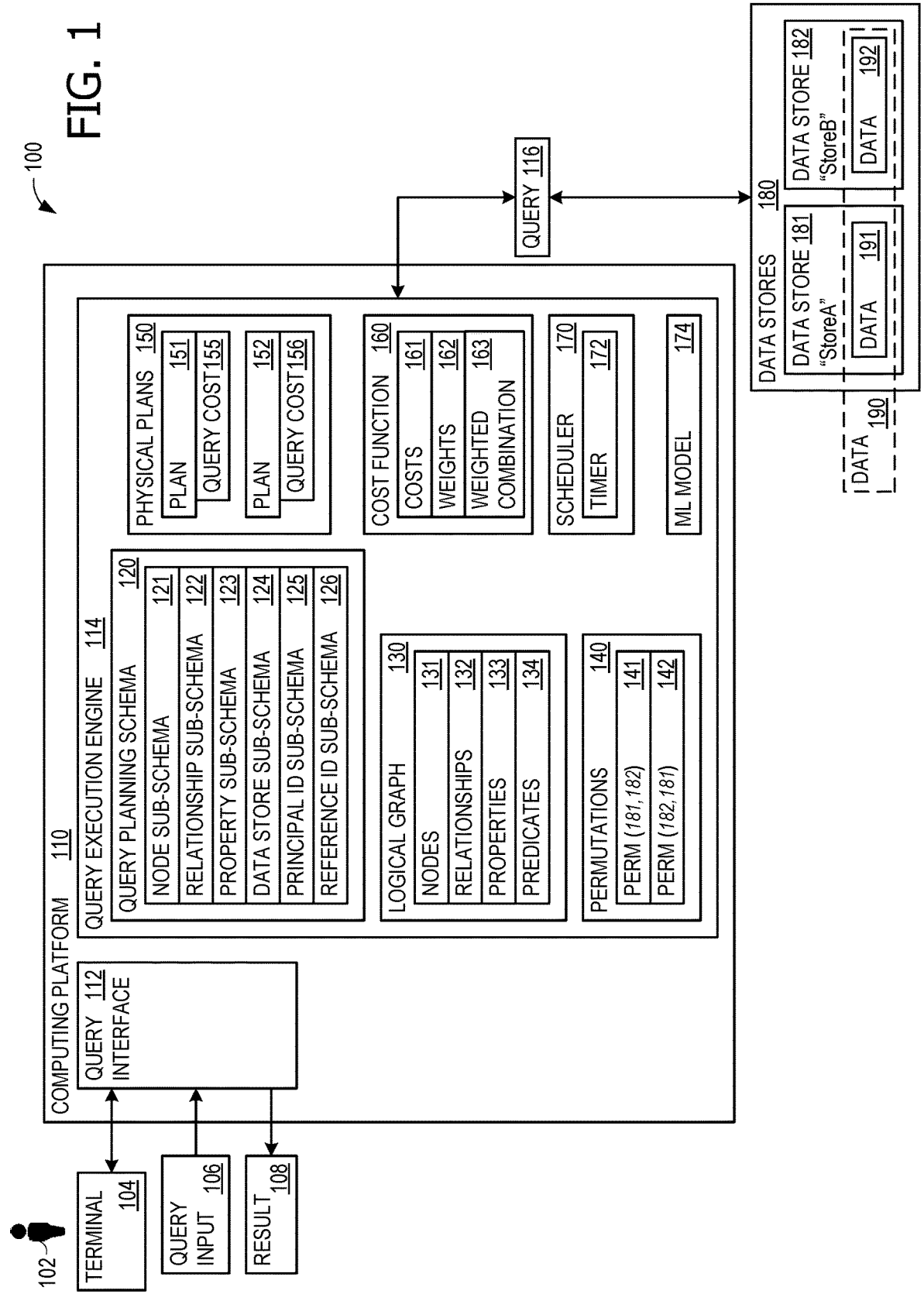
FIG. 1 illustrates an example architecture that advantageously provides for distribution of federated graph queries using schemas.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Example solutions for performing federated graph queries use schemas and include: generating a logical graph using a query input and generating a physical plan using a query planning schema for double-nested loops, the outer loop for each permutation of data stores in a set of data stores, and the inner loop for each data store—ceasing when the logical graph has been fully consumed. A query cost is determined for each of the permutations, and a physical plan is selected based on the query cost, for example minimizing the query cost, and the query is executed based on the selected physical plan. The cost may be determined based on a weighted combination of factors such as freshness of the data, latency, power consumption, environmental impact (e.g., carbon footprint), energy efficiency, and network burden.

Aspects of the disclosure improve the efficiency of computing devices, for example, reducing power consumption and the number of storage devices required in order to perform database queries, by permitting queries to be performed efficiently across disparate data stores, rather than requiring that the data is copied to a single data store. This is accomplished by generating a physical plan using a query planning schema, for various permutations of data stores to be searched, and then executing a query using a selected physical plan. In this way, aspects of the disclosure perform efficient execution of distributed graph queries by leveraging rich schemas over the data. Examples leverage centralized data repositories as well as specialized heterogeneous stores according to a distributed graph query needs for reducing data inconsistency and query execution latency.

A federated search is used to search multiple data sources with just a single query from a single search interface. Data sources includes databases, key-value stores, application programming interfaces (APIs) that pull data from other sources, and other data sources that are collectively referred to herein as data stores. A query planning schema is leveraged to enable a single query execution engine to treat disparate data stores, which have potentially differing search capabilities, differing data content, differing latencies, differing physical characteristics (e.g., power sources), and other differences, as a single graph. The actual query execution may be centralized, distributed, or a mixture.

Aspects of the disclosure are operable to search data in various technical fields such as web searching, employee roster querying (e.g., reporting hierarchies), searching customer activity history, searching computing resource allocation and usage, and more.

FIG. 1 illustrates an example architecture 100 that advantageously provides for distribution of federated graph queries using schemas. A user 102 uses a terminal 104 to access a query interface 112 on a computing platform 110. Computing platform 110 may be remote from user 102, local to user 102 (e.g., terminal 104 and computing platform 110 are a common computing environment), distributed, virtual, or may be a single computing device. User 102 enters a query input 106 to perform a query 116 over data 190, and receives a query result 108 from a query execution engine 114.

Data 190 is distributed among a set of data stores 180 that includes a data store 181, named "StoreA", and a data store 182, named "StoreB". Data store 181 has data 191, which is a portion of data 190, and data store 182 has data 192, which is another portion of data 190. For illustration purposes, only two data stores are shown, although it should be understood that some examples use a significantly larger number of data stores.

Query execution engine 114 uses a query planning schema 120 to plan query 116 such that query 116 is executed efficiently according to a cost function 160. As a preview to the more detailed description following, query execution engine 114 (1) generates a logical graph 130 from query input 106, (2) lists permutations 140 of set of data stores 180, (3) generates physical plans 150 (e.g., one for each permutation in permutations 140) that consume logical graph 130 using query planning schema 120, (4) determines a query cost for each physical plan (e.g., one for each permutation), (5) selects a physical plan based on its query cost, and (6) executes query 116 according to the selected physical plan.

Query planning schema 120 includes multiple sub-schema: node sub-schema 121, described in further detail in relation to FIG. 3A; relationship sub-schema 122, described in further detail in relation to FIG. 3B; property sub-schema 123, described in further detail in relation to FIG. 3C; data store sub-schema 124, described in further detail in relation to FIG. 3D; principal identifier (ID) sub-schema 125, described in further detail in relation to FIG. 4A; and reference ID sub-schema 121, described in further detail in relation to FIG. 4B. Logical graph 130 has nodes 131, which are connected using relationships 132 that are graph edges. Nodes 131 and relationships 132 have properties indicated in properties 133, and logical graph 130 also has set of predicates 134 calculated from query input 106.

Permutations 140 has two permutations shown, permutation 141, which is {StoreA, StoreB} (also identifiable as {data store 181, data store 182}), and permutation 142, which is {StoreB, StoreA} (also identifiable as {data store 182, data store 181}). In general, a larger number of data stores produces a larger number of permutations. In some examples, the number of permutations may be limited by a machine learning (ML) model 174, for example by ML model 174 identifying which permutations are not selected or rarely selected, and/or predicting which permutations are sufficiently unlikely to be selected to exclude them from consideration.

Physical plans 150 include a physical plan 151 and a physical plan 152. Physical plan 151 is for permutation 141 and has a query cost 155, whereas physical plan 152 is for permutation 142 and has a query cost 156. Physical plan 151 is indicated as being the selected physical plan, in this illustrated example, which is due to query cost 155 being the lowest query cost among query cost 155 and query cost 156 (e.g., the lowest query cost of the permutations). A physical plan is the query that is actually executed, and includes the sequence of operations that is performed on each store in which data is actually stored, whereas logical graph 130 is the structure of what user 102 is attempting to extract from data 190 when formulating query input 106.

A cost function 160 is used to determine query costs 155 and 156, and is made up of both costs 161 and weights 162 into a weighted combination 163 of costs. Examples of costs include freshness of the data, latency of communicating with each data store, power consumption by a data store, environmental impact such as whether the data store receives its power from renewable sources and/or the carbon footprint of the data store, energy efficiency of the data store, network cost such as the number of input/output (TO) operations, and a count of different data stores used. In some scenarios, it may be preferable to use a single data store, if practical. The various costs enable user 102 to prioritize query execution on issues such as a preference for lower latency and/or a preference for a lower carbon footprint.

A scheduler 170 uses a timer 172 to determine whether pendency of query 116 has been long enough to reprioritize weights 162 for latency, or whether other preferences remain practical. For example, user 102 may have expressed a preference for energy efficiency and so weights 162 are set accordingly. However, if the most energy-efficient data stores are slow to respond, and query 116 has been pending for longer than some threshold time, scheduler 170 may adjust weights 162 to change the preference for latency. The consequences of changing weights 162 is that query costs 155 and 156 may each change, and the physical plan that had been selected initially is jettisoned for a new selected physical plan, based on the new values of query costs 155 and 156.

ML model 174 may be used to optimize queries for some weighted combination of costs 161. Query planning schema 120 includes information about data provenance and expected freshness guarantees, so that optimization decisions may based on this information, for example freshness versus latency and consistency. Querying across data stores may result in a performance penalty (e.g., higher latency) but may, in certain scenarios, yield superior data freshness (e.g., more recent data). Adding statistics about expected latency makes it possible to further increase the accuracy of optimization decisions. ML model 174 may use rule-based optimizations and/or heuristics/cost-based optimizations.

An example consistent property graph includes nodes, relationships, and properties. Nodes may have multiple labels expressing its type or subclass. Relationships may similarly have types, specifying the intent of the relationship. Strict relationship types may additionally require particular node labels and directionality of the relationship in order to be semantically correct. For example, a relationship describing the modification of a document by an individual may require two different node labels fixed to prescribed sides of the relationship (e.g., person and document). Both nodes and relationship types may be used by a query to sub-divide relevant subsections of a particular graph.

Both nodes and relationships may hold unique identifiers specific to instances of each. However, only node identifiers may be used as a starting point for ordered traversal of a graph. Nodes may hold any number of relationships regardless of direction; however, valid relationships require two nodes to exist. Both relationships and entities may hold a selection of properties. Properties hold a key for identifying a particular entry in a set of properties, and for each, a value. These values may hold scalar values such as integers, strings, or temporal values such as time. Properties are uniquely defined by nodes or relationships, and any instance of each may hold differing sets of properties.

Figure 2:
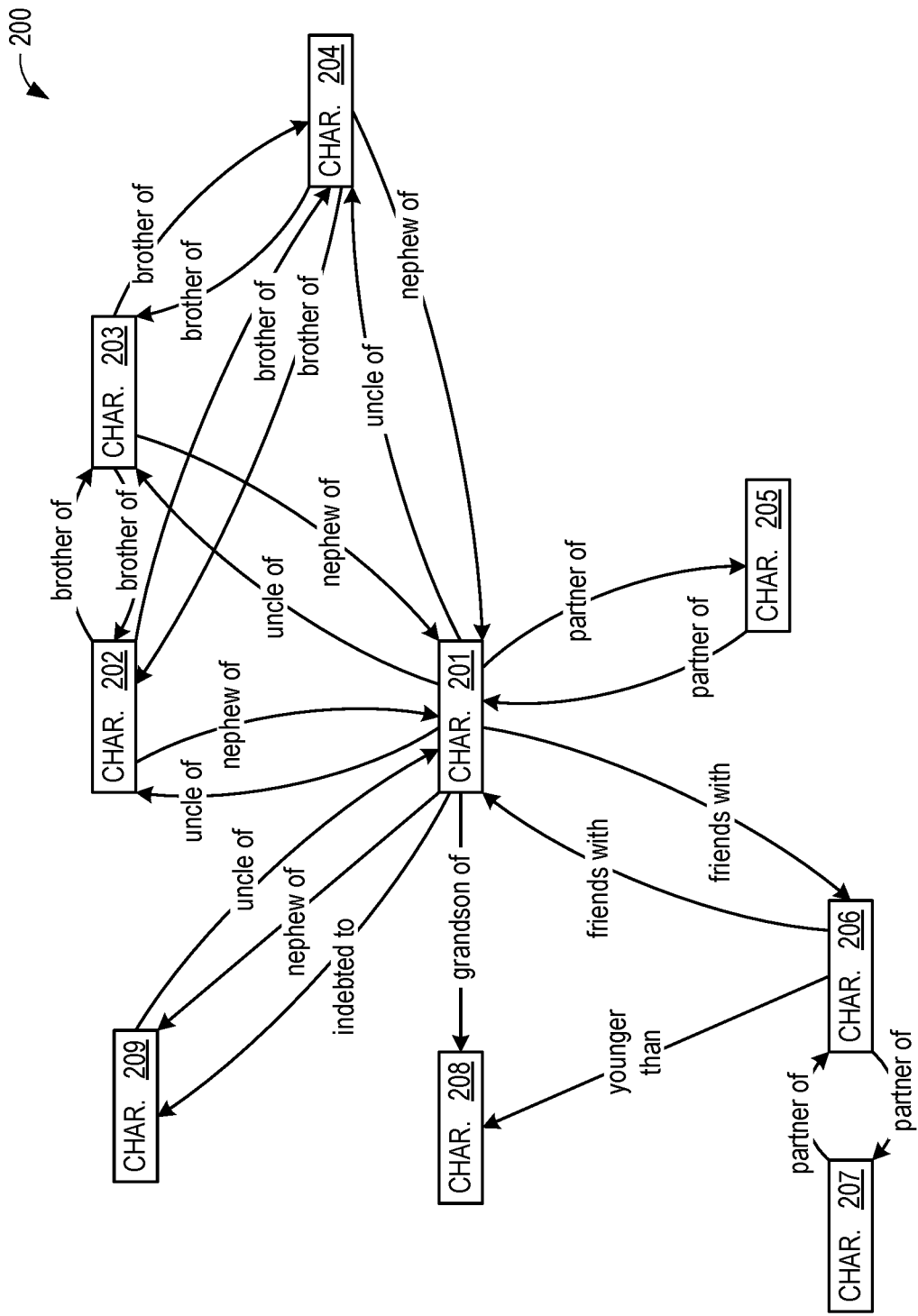
FIG. 2 illustrates an exemplary graph for explaining the operation of example architectures, such as the architecture of FIG. 1.

FIG. 2 illustrates an exemplary graph 200 that is used to provide descriptions of nodes and edges. Graph 200 represents characters in a story and includes nine characters, characters 201-209. Character 201 has relationships shown with each of characters 202-206 and characters 208 and 209. The relationships are directional. Character 201 is an uncle of character 202, and character 202 is a nephew of character 201. This relationship pairing also exists between character 201 and each of character 203 and character 204. Characters 202, 203, and 204 have relationships among each other of being brothers. Character 201 is a partner of character 202, who has a reciprocal partner relationship with character 201.

Character 206 is a friend of character 201, who has a reciprocal friend relationship with character 206. Character 206 is a partner of character 207, who has a reciprocal partner relationship with character 206. Some relationships that are mirrored between nodes (e.g., partner of, brother of, friends with) may be modeled as a single bi-directional relationship, in some examples.

Character 206 is younger than character 208, and character 201 is a grandson of character 208. Character 201 is a nephew of character 209, and character 209 is an uncle of character 201. Character 201 is also indebted to character 209. An example of relationship identifiers and properties for graph 200, in which Uncle Sam (last name Wilson) is the uncle of John Doe, is: [character 201; <ID>: 0; FirstName: John; LastName: Doe; Name: John Doe], [character 209; <ID>: 8; FirstName: Sam; LastName: Wilson; Name: Sam Wilson], and [indebted to; <ID>: 81; Amount: $100]. Each node and relationship has its own properties, and the identifiers uniquely identify a node or relationship.

FIGS. 3A-3D, 4A, and 4B illustrate exemplary sub-schema of query planning schema 120. Query planning schema 120 is complete in that it covers the relevant aspects of query planning and run-time execution. Node sub-schema 121 describes aspects specific to nodes, and an example 300a is shown in FIG. 3A. Three fields are illustrated, named ID, Properties, and Provenance. The ID is the principal ID, or external ID, of the node. Properties is a set of properties available on the node that may be referenced to express filtering, ordering, or other parameters, or returned in the response payload of query result 108. Provenance describes the origin and availability of the node, such as in which storage systems the node is found, which should be considered the authoritative source, which are considered caches, and/or freshness information.

Relationship sub-schema 122 describes aspects specific to relationships, and an example 300b is shown in FIG. 3B. Four fields are illustrated, named Source ID, Target ID, Properties, and Type. Source ID is the ID of the node from which the relationship is outbound. Target ID is the ID of the node to which the relationship is inbound. Properties is a set of available relationship properties, with similar uses as node properties. Type is the type of relationship.

Property sub-schema 123 applies to all properties, whether they stored on nodes or relationships (edges), and an example 300c is shown in FIG. 3C. Four fields are illustrated, named Property Name, Type, Data Classification, and Provenance. Property Name is a string that uniquely identifies the property in the global schema. Type is the type of the property, such as string, integer, byte, or other data type. Data Classification is the classification of the property, indicating sensitivity or dissemination limits. Examples include personally identifiable information (PID, such as European Union (EU) protected PII, pseudonymized information, anonymized information, and unprotected information. Provenance describes the origin and availability of the property, such as in which storage systems the property is found, which should be considered the authoritative source, which are considered caches, and/or freshness information.

Data Store sub-schema 124 describes the capabilities of a given data store, and an example 300d is shown in FIG. 3D. Three fields are illustrated, named Store ID, Store Name, and Capabilities. Store ID is a unique identifier for a particular data store. Store Name is a label of the store that is more useful for human understanding. For example, Store ID may be a hexadecimal number, whereas Store Name may have useful information that enables a human reader to more readily appreciate the location and/or other aspects of a data store. Capabilities identifies query search capabilities supported by the data store.

In addition, due to the distributed nature of the data, for the data to be referenced as a graph, both nodes and relationships are addressable. Addressing uses identifiers. Some examples use two types of identifiers: principal IDs, also known as external IDs, and reference IDs. Principal IDs identify a logical item and serves as a globally unique id to locate some entity (e.g., node or relationship/edge). Principal IDs are defined using principal ID sub-schema 125, and an example 400a is shown in FIG. 4A. Two fields are illustrated, named Data Classification and Value. Data Classification is equivalent to the Data Classification field of property sub-schema 123, although applied to principal ID sub-schema 125. Value is a unique identifier of an entity (e.g., node or relationship) within the global arrangement.

Reference IDs identify a physical item, and are used internally in the graph to allow multiple (e.g., partial) representations of the same logical entity (e.g., node or relationship/edge). Reference IDs are defined using reference ID sub-schema 126, and an example 400b is shown in FIG. 4B. Four fields are illustrated, named Data Classification, Region ID, System ID, and Value. Data Classification is equivalent to the Data Classification field of property sub-schema 123, although applied to reference ID sub-schema 126. Region ID is an identification of the logical region in which an entity is located. System ID is an identification of the target system in which an entity is located. Value is a unique identifier of an entity (e.g., node or relationship) within a specific target system and region pair.

FIGS. 5A-5F illustrate example queries and schema details. FIG. 5A illustrates an example 500a for a scenario in which a property exists only in a single data store. Query input 106 is [MATCH (user) WHERE id(user)="userId" RETURN user.Name, user.EmailAddress]. In this scenario, the federated query must be directed towards the data store containing the requested property, which is StoreA (data store 181).

While the Name may be retrieved from both StoreA and StoreB, the EmailAddress can be retrieved from only StoreA. This means that in order to fulfill the query, StoreA must be targeted. Whether the query retrieves Name from StoreA or StoreB depends on the latency and other performance characteristics of the distributed system and the underlying stores.

FIG. 5B illustrates an example 500b for a scenario in which a relationship (edge) exists only in a single data store. Query input 106 is [MATCH (user)-[r:Messaged]->(friend) WHERE id(user)="userId"; RETURN user.Name, friend.Name]. In this scenario, the federated query must be directed towards the data store containing the requested relationship, which is StoreB (also referred to as data store 182).

While the Name may be retrieved from both StoreA and StoreB, the ID can be retrieved from only StoreB. This means that in order to fulfill the query, StoreB must be targeted. Whether the query retrieves Name from StoreA or StoreB depends on the latency and other performance characteristics of the distributed system and the underlying stores.

FIG. 5C illustrates an example 500c for a scenario in which only a single data store supports the search capability indicated in the query, and fortunately also holds all the required data. Query input 106 is [MATCH (user)-[r:Modified]->(document); WHERE id(user)="userId" AND document.Title="Status Update"; RETURN user.Name, document.Title]. In this scenario, the federated query must be directed towards the data store supporting the requested capability and holding the required data to successfully evaluate the query, which is StoreB (also referred to as data store 182).

While the Name, Document Title, and Messaged may be retrieved from both StoreA and StoreB, and both StoreA and StoreB support traversal of edges (e.g., relationships), only StoreB supports looking up a node by performing a search and finding an exact match on a given property. This means that in order to fulfill the query, StoreB must be targeted to identify the relevant documents. Apart from this step of the query, both StoreA and StoreB have the necessary data and capabilities to continue the remainder of the query execution. Which data store chosen depends on latency, performance, resource consumption, or other aspects of the query cost function.

FIG. 5D illustrates an example 500d for a scenario in which multiple data stores supports the search capability indicated in the query, but only a single data store holds the required data. Query input 106 is [MATCH (user)-[r:Modified]->(document); WHERE id(user)="userId" AND document.Title="Status Update"; RETURN user.Name, document. Title]. In this scenario, the federated query must be directed towards the data store holding the required data, which is StoreA (also referred to as data store 181).

While the Name and Message may be retrieved from both StoreA and StoreB, and both StoreA and StoreB support traversal of edges as well as looking up a node by looking up a node by performing a search and finding an exact match on a given property, only StoreA holds Document Title. This means that in order to fulfill the query, StoreA must be targeted to identify the relevant documents. Apart from this step of the query, both StoreA and StoreB have the necessary data and capabilities to continue the remainder of the query execution. Which data store chosen depends on latency, performance, resource consumption, or other aspects of the query cost function.

FIG. 5E illustrates an example 500e for a scenario in which multiple data stores hold the required data, but user 102 has prioritized data consistency (e.g., as a context parameter input with the query). Query input 106 is [MATCH (user) WHERE id(user)="userId" RETURN user.Name]. In this scenario, the federated query is directed towards the data store having AuthoritativeSource set to "true", which is StoreA (also referred to as data store 181). StoreB (also referred to as data store 182) has AuthoritativeSource set to "false", indicating that StoreB has a replica of the data.

Both StoreA and StoreB support looking up a node by its ID and contain the required data (e.g., Name). However, StoreA has a much superior freshness guarantee (e.g., more recent data) than StoreB, and would therefore be prioritized when executing a query that prioritized freshness.

FIG. 5F illustrates an example 500f for a scenario in which multiple data stores hold the required data, but user 102 has prioritized latency (e.g., as a context parameter input with the query). Query input 106 is [MATCH (user) WHERE id(user)="userId" RETURN user.Name]. In this scenario, the federated query is directed towards the data store having the lowest latency, which is StoreB (also referred to as data store 182).

Both StoreA and StoreB support looking up a node by its ID and contain the required data (e.g., Name). However, StoreA has an average observed latency of 250 milliseconds (ms), whereas StoreB has an average observed latency of 30 ms. Thus, StoreB is prioritized when executing the query. The observed latency for a data store is not strictly a part of query planning schema 120, but rather metadata generated while operating query execution engine 114. It should be understood that other metrics may also be relevant, such as data store reliability, the estimated carbon footprint of a query execution, the estimated monetary cost of a query execution, and others. Some metrics may be part of data store sub-schema 124, while others are be observed and/or calculated as part of operating query execution engine 114.

Figure 6:
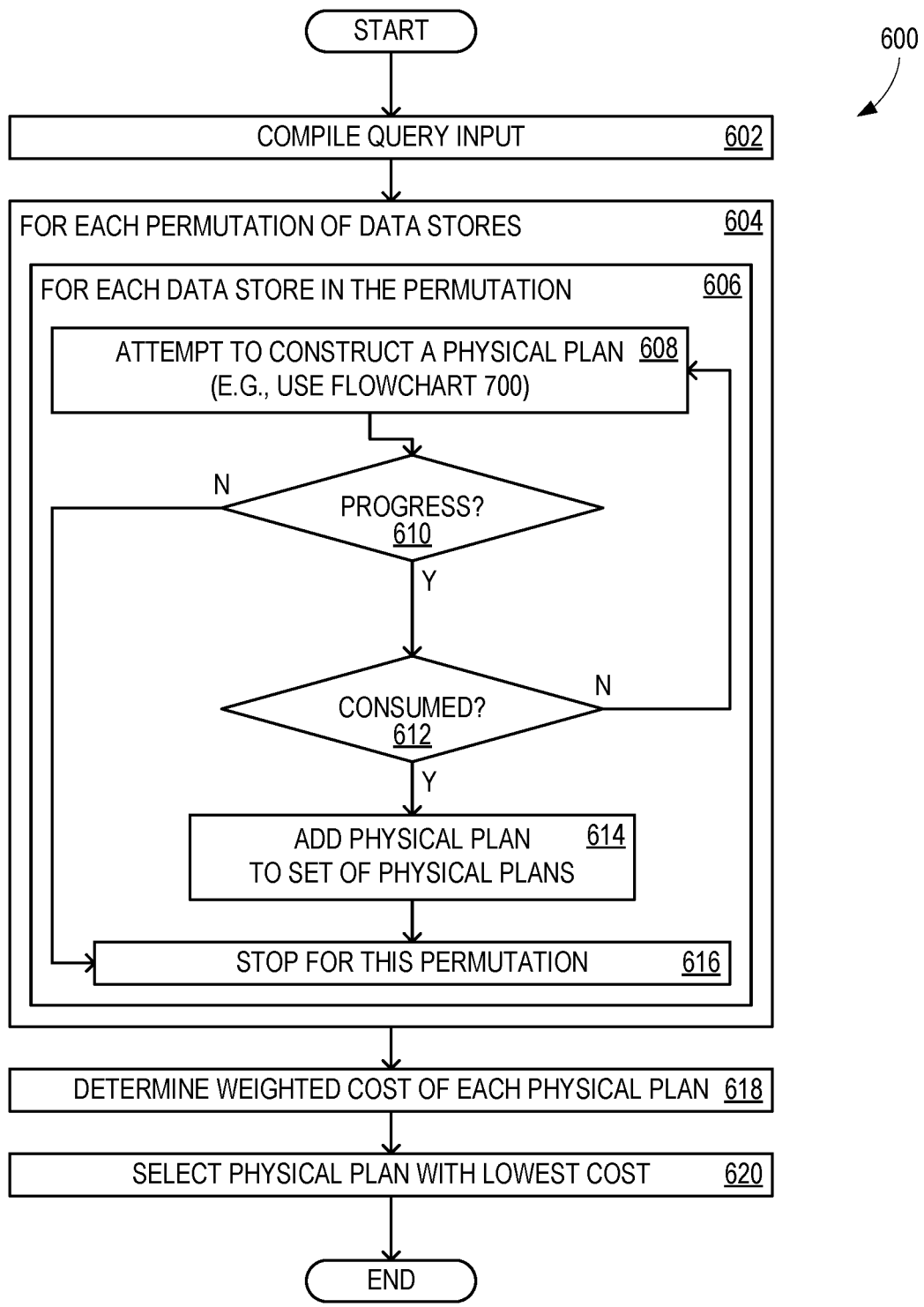
FIG. 6 shows a flowchart illustrating exemplary operations that may be performed when constructing a federated query using example architectures, such as the architecture of FIG. 1.
Figure 7:
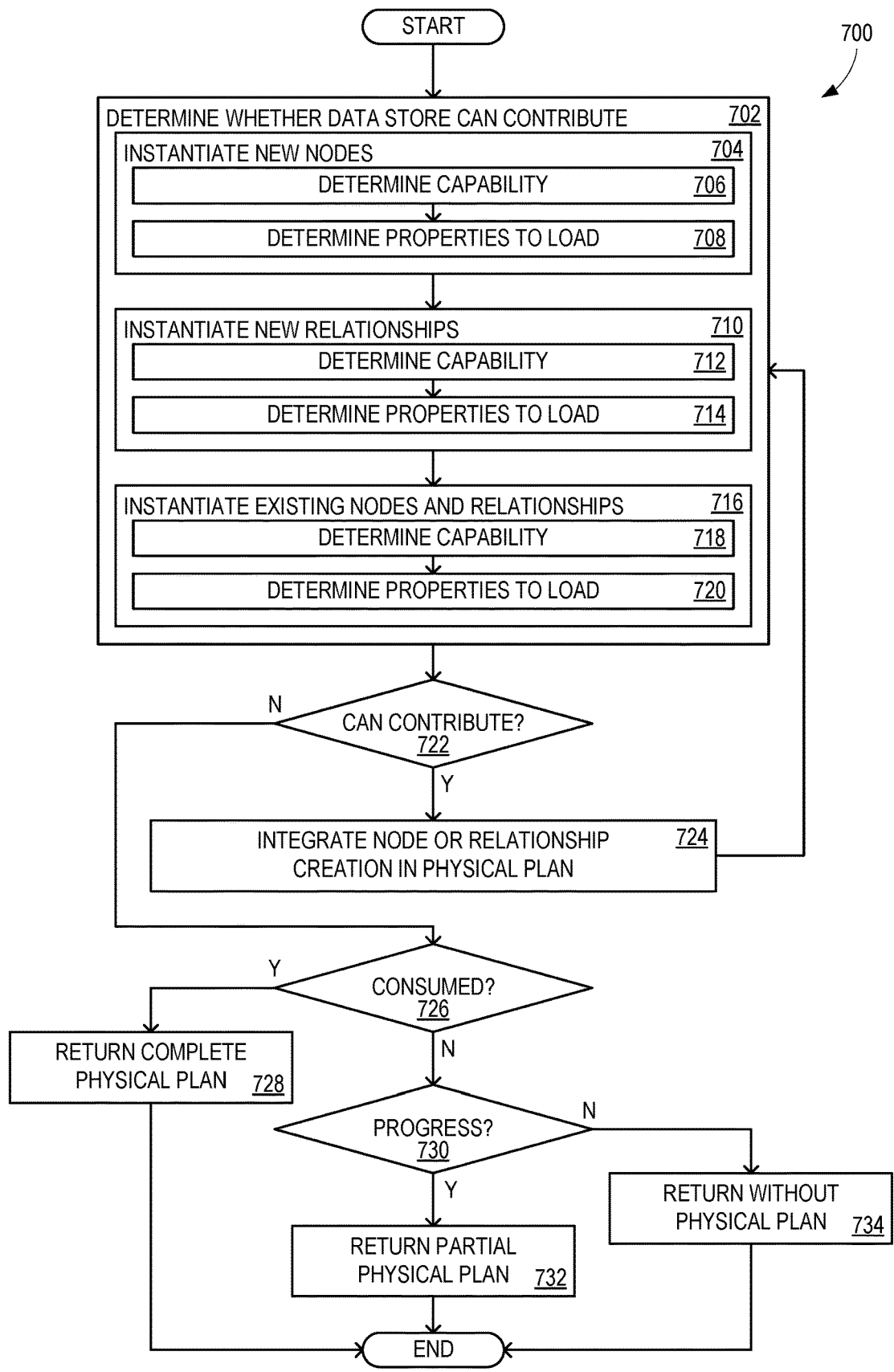
FIG. 7 shows another flowchart illustrating exemplary operations that may be performed when constructing a federated query using example architectures, such as the architecture of FIG. 1.

FIG. 6 shows a flowchart 600 illustrating exemplary operations that may be performed by architecture 100, and FIG. 7 shows a flowchart 700 also illustrating exemplary operations that may be performed by architecture 100. Together, flowcharts 600 and 700 provide a first description of the construction of a federated graph query (e.g., query 116); a complementary description is provided by flowchart 800 of FIG. 8. In some examples, operations described for flowcharts 600 and 700 are performed by computing device 1000 of FIG. 10.

Flowchart 600 commences with compiling query input 106 in operation 602, to produce logical graph 130 for instantiation. Operation 604 sets up an outer loop that is performed for each permutation of data stores that are available for performing query 116. Operation 606 sets up an inner loop for each data store in the permutation (in order), within the loop of operation 604. Operation 608 attempts to construct a physical plan (e.g., an expression tree) from the remaining portion of logical graph 130 that is yet to be consumed. Operation 608 uses flowchart 700 of FIG. 7, described below.

Decision operation 610 determines whether flowchart 700 made any progress on consuming logical graph 130. If not, flowchart 600 moves to operation 616 that stops the inner loop for the current permutation, so that flowchart 600 may move on to the subsequent permutation. If, however, progress had been made on consuming more of logical graph 130, decision operation 612 determines whether the entirety of logical graph 130 is consumed. If so, operation 614 adds the current physical plan to the growing set of possible physical plans (e.g., physical plan 152 is added to physical plans 150) and flowchart 600 moves to operation 616 to cease for this permutation.

Otherwise, if progress had been made, and logical graph 130 remains only partially consumed, flowchart 600 returns to operation 608 to continue building the current partial physical plan for this permutation, using an updated logical graph 130. When both loops are exited, operation 618 determines (e.g., calculates or generates) the weighted cost of each physical plan, and operation 620 select the physical plan with the lowest weighted cost.

This consumption algorithm of flowchart 700, performed as part of operation 608 and shown in FIG. 7, is performed for a single data store, whether the logical graph is partially consumed or not at all, and then returns to flowchart 600. Flowchart 700 commences with determining whether the current data store is able to contribute progress towards completing the consumption of logical graph 130 using query planning schema 120, in operation 702.

Operation 704 instantiate new nodes of logical graph 130, using operations 706 and 708. Operation 706 determines whether the data store has any capability to instantiate nodes and whether there is a predicate present that may be used for this purpose. Operation 708 determines which of the required properties from the graph may be loaded. Operation 710 instantiate new relationships of logical graph 130, using operations 712 and 714. Operation 712 determines whether the data store has any capability to instantiate relationships and whether there is a predicate present that may be used for this purpose. Operation 714 determines which of the required properties from the graph may be loaded. Operation 716 instantiate existing nodes and relationships of logical graph 130 with new properties, using operations 718 and 720. Operation 718 determines whether the data store has any capability to instantiate nodes and/or relationships by using IDs of existing nodes and/or relationships or whether there is a predicate present that may be used for this purpose. Operation 720 determines which of the required properties from the graph may be loaded.

Decision operation 722 determines whether the current data store can contribute progress to the consumption of logical graph 130. There must be at least one new property loaded, otherwise there will be no consumption progress made. If the current data store can contribute, operation 724 integrates node or relationship creation in the physical plan, marks related nodes, relationships, properties, and predicates as consumed, and repeats from operation 704 with the updated logical graph 130.

Otherwise, if further contribution cannot be made, decision operation 726 determines whether logical graph 130 is fully consumed. If so, operation 728 returns the resulting complete physical plan with no remaining logical graph. If logical graph 130 is not fully consumed, decision operation 730 determines whether at least some progress has been made for this data store. If so, operation 732 returns the remaining logical graph 130 along with the partial physical plan for the current data store. If no progress has been made with this data store, operation 734 returns the input logical graph 130 with no physical plan progress.

Figure 8:
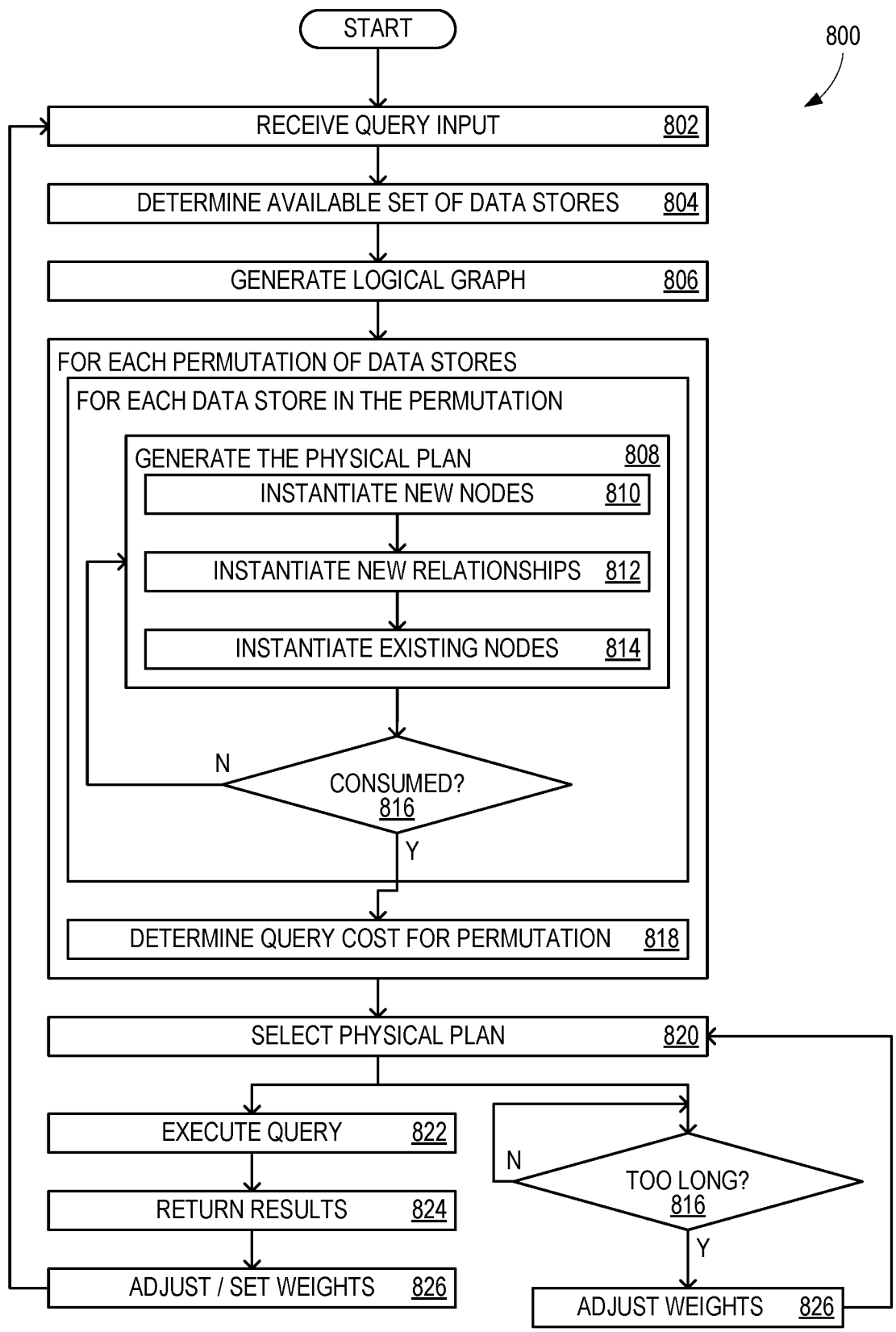
FIG. 8 shows a flowchart illustrating exemplary operations that may be performed when using example architectures, such as the architecture of FIG. 1.

FIG. 8 shows a flowchart 800 illustrating exemplary operations that may be performed by architecture 100, and provides a description of the query process that complements flowcharts 600 and 700. In some examples, operations described for flowchart 800 are performed by computing device 1000 of FIG. 10. Flowchart 800 commences with receiving query input 106 in operation 802. Operation 804 determines set of data stores 180 that are available for performing query 116. Operation 806 generates logical graph 130 based on at least query input 106. Logical graph 130 comprises nodes, relationships, and properties required to satisfy query input 106, and further comprises set of predicates 134 calculated from query input 106.

Flowchart 800 performs a double-nested loop, in which the outer loop is performed for each permutation of data stores in set of data stores 180 that is to be considered, and the inner loop is performed for each data store in the permutation, while logical graph 130 has not yet been fully consumed. In some examples, not every possible permutation of data stores is considered. For example, some permutations may be omitted by ML model 17, due to the low likelihood of selection of that permutation.

Operation 808 is performed within the inner loop, using operations 810-814 to generate physical plans 150 based on at least query planning schema 120. In some examples, query planning schema 120 comprises node sub-schema 121, relationship sub-schema 122, property sub-schema 123, data store sub-schema 124, principal ID sub-schema 125, and reference ID sub-schema 126. Operation 810 instantiates new nodes of logical graph 130 and loads required properties. Operation 812 instantiates new relationships of logical graph 130 and loads required properties. Operation 814 instantiates existing nodes of logical graph 130 and loads required properties.

Decision operation 816 determines whether logical graph 130 has been fully consumed by the existing physical plan. If so, flowchart 800 exits the inner loop to operation 818. Otherwise, flowchart 800 remains within the inner loop and returns to operation 808 to continue building the current physical plan using the next data store listed in the current permutation.

Operation 818 determines the query cost for the permutation, such as query cost 155 for physical plan 151 of permutation 141 or query cost 156 for physical plan 152 of permutation 142. In some examples, the query cost comprises at least one cost or a weighted combination of costs selected from one or more of: freshness, latency, power consumption, environmental impact, energy efficiency, network cost, and a count of different data stores used. Operation 820 selects the selected physical plan (e.g., physical plan 151) based on at least the query cost of each permutation.

Operation 822 executes query 116 based on at least the selected physical plan, and operation 824 returns query results 108 of query 116. In operation 826, ML model 174 monitors the performance of query 116 and determining weights 162 for the combination weighting of weighted combination 163. Weighted combination 163 should then improve the performance of the next query when flowchart 800 returns to operation 802.

In parallel with operation 822, scheduler 170 monitors timer 172 to determine whether query 116 has been pending for too long, in decision operation 828. If so, operation 830 adjusts weights 162 of weighted combination 163, and when flowchart 800 returns to operation 820 a new physical plan is selected for execution as query 116.

Figure 9:
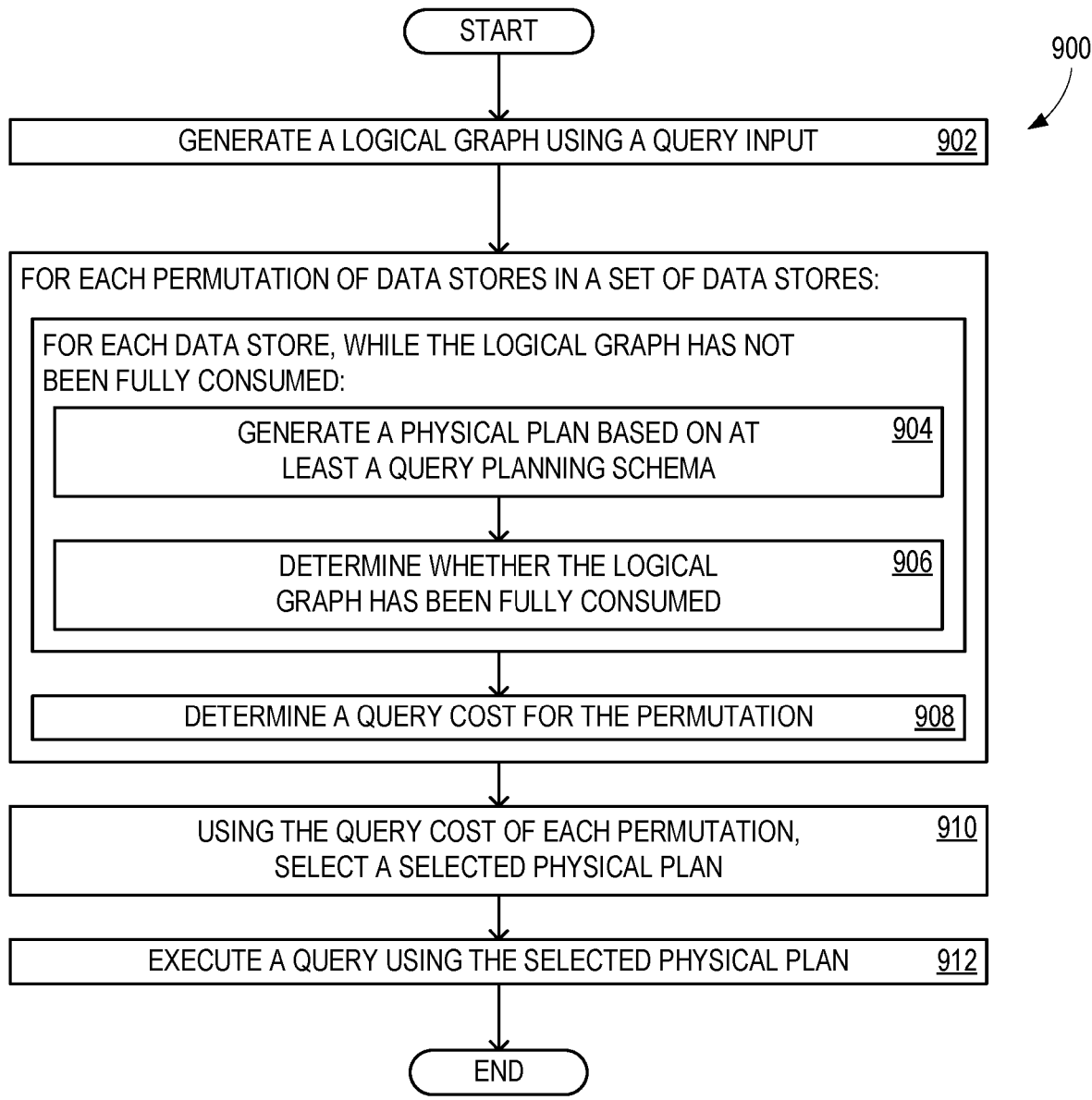
FIG. 9 shows another flowchart illustrating exemplary operations that may be performed when using example architectures, such as the architecture of FIG. 1.

FIG. 9 shows a flowchart 900 illustrating exemplary operations that may be performed by architecture 100. In some examples, operations described for flowchart 900 are performed by computing device 1000 of FIG. 10. Flowchart 900 commences with operation 902, which includes generating a logical graph using a query input.

Operations 904 and 906 are performed within a double-nested loop, and operation 906 is performed within the outer loop. The outer loop is performed for each permutation of data stores in a set of data stores, and the inner loop is performed for each data store in the permutation (e.g., in the order given by the permutation), while the logical graph has not been fully consumed. Operation 904 includes generating a physical plan using a query planning schema, and operation 906 includes determining whether the logical graph has been fully consumed. Operation 908 includes determining a query cost for the permutation. Operation 910 includes, using the query cost of each permutation, selecting a selected physical plan, and operation 912 includes executing a query using the selected physical plan.

Additional Examples

An example system for performing federated graph queries across multiple data stores comprises: a processor; and a computer-readable medium storing instructions that are operative upon execution by the processor to: generate a logical graph using a query input; for each permutation of data stores in a set of data stores: for each data store, while the logical graph has not been fully consumed: generate a physical plan using a query planning schema; and determine whether the logical graph has been fully consumed; and determine a query cost for the permutation; using the query cost of each permutation, select a selected physical plan; and execute a query using the selected physical plan.

An example method of performing federated graph queries across multiple data stores comprises: generating a logical graph using a query input; for each permutation of data stores in a set of data stores: for each data store, while the logical graph has not been fully consumed: generating a physical plan using a query planning schema; and determining whether the logical graph has been fully consumed; and determining a query cost for the permutation; using the query cost of each permutation, selecting a selected physical plan; and executing a query using the selected physical plan.

One or more example computer storage devices have computer-executable instructions stored thereon, which, on execution by a computer, cause the computer to perform operations comprising: generating a logical graph using a query input; for each permutation of data stores in a set of data stores: for each data store, while the logical graph has not been fully consumed: generating a physical plan using a query planning schema; and determining whether the logical graph has been fully consumed; and determining a query cost for the permutation; using the query cost of each permutation, selecting a selected physical plan; and executing a query using the selected physical plan.

Alternatively, or in addition to the other examples described herein, examples include any combination of the following:
  receiving the query input;
  determining the set of data stores;
  the logical graph comprises nodes, relationships, and properties required to satisfy the query input;
  the logical graph comprises a set of predicates calculated from the query input;
  the query planning schema comprises a node sub-schema;
  the node sub-schema comprises identifier, properties, and provenance fields;
  the query planning schema comprises a relationship sub-schema;
  the relationship sub-schema comprises source node identifier, target node identifier, properties, type, and provenance fields;
  the query planning schema comprises a property sub-schema;
  the property sub-schema comprises property name, type, data classification, and provenance fields;
  the query planning schema comprises a data store sub-schema;
  the data store sub-schema comprises data store identifier, data store name, and capabilities fields;
  the query planning schema comprises a principal identifier sub-schema;
  the principal identifier sub-schema comprises data classification and value fields;
  the query planning schema comprises a reference identifier sub-schema;
  the reference identifier sub-schema comprises data classification, region identifier, system identifier, and value fields;
  generating the physical plan based comprises instantiating new nodes of the logical graph and loading required properties; instantiating new relationships of the logical graph and loading required properties; and instantiating existing nodes of the logical graph and loading required properties;
  the query cost comprises at least one cost or a weighted combination of costs selected from the list consisting of: freshness, latency, power consumption, environmental impact, energy efficiency, monetary cost, network cost, a count of different data stores used;
  determining the combination weighting of the weighted combination of costs using an ML model;
  using elapsed time since receiving the query input, adjusting the weighted combination of costs while the query is pending; and
  returning results of the query.

While the aspects of the disclosure have been described in terms of various examples with their associated operations, a person skilled in the art would appreciate that a combination of operations from any number of different examples is also within scope of the aspects of the disclosure.

Example Operating Environment

Figure 10:
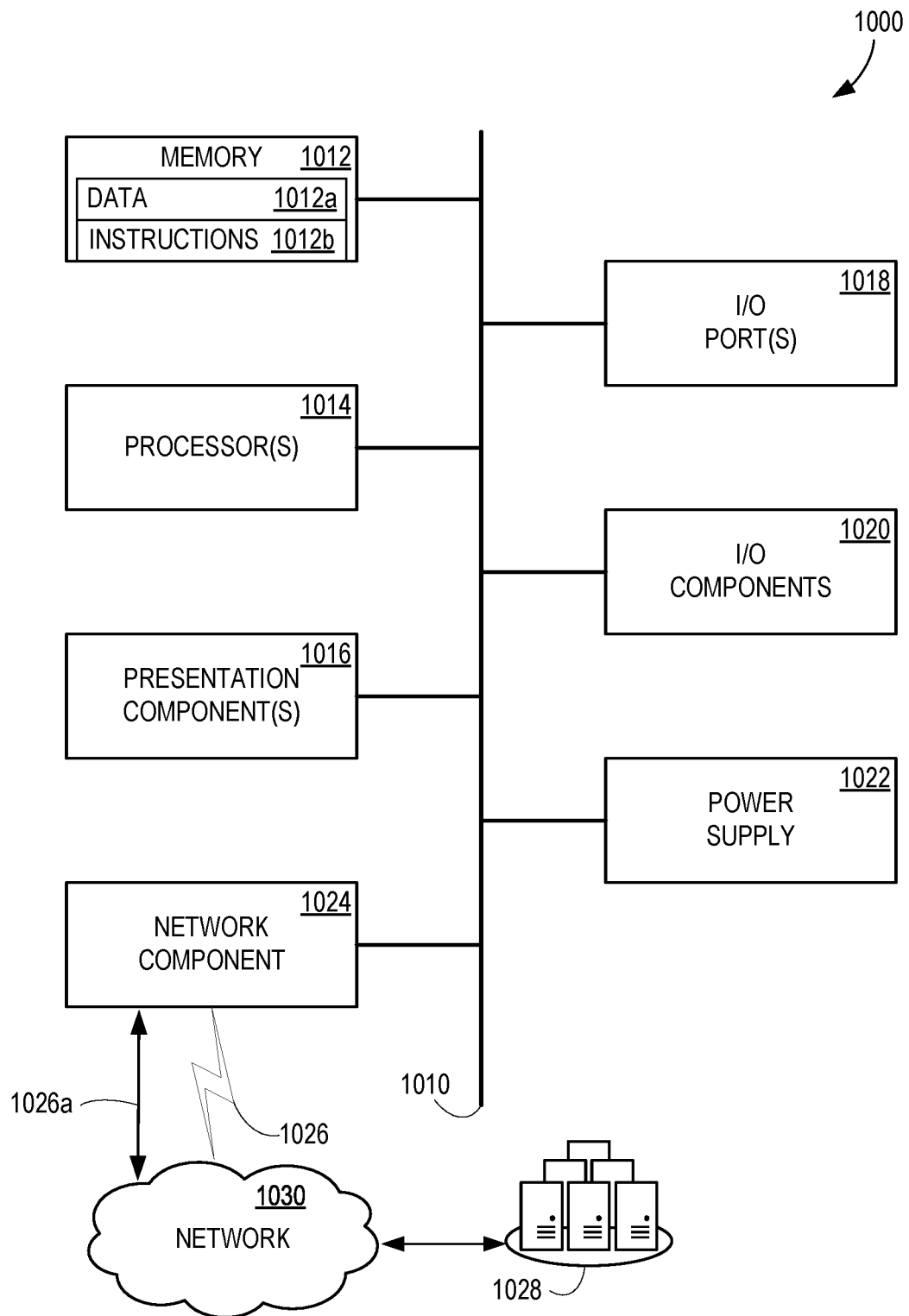
FIG. 10 shows a block diagram of an example computing device suitable for implementing some of the various examples disclosed herein.

FIG. 10 is a block diagram of an example computing device 1000 (e.g., a computer storage device) for implementing aspects disclosed herein, and is designated generally as computing device 1000. In some examples, one or more computing devices 1000 are provided for an on-premises computing solution. In some examples, one or more computing devices 1000 are provided as a cloud computing solution. In some examples, a combination of on-premises and cloud computing solutions are used. Computing device 1000 is but one example of a suitable computing environment and is not intended to suggest any limitation as to the scope of use or functionality of the examples disclosed herein, whether used singly or as part of a larger set.

Neither should computing device 1000 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1000 includes a bus 1010 that directly or indirectly couples the following devices: computer storage memory 1012, one or more processors 1014, one or more presentation components 1016, input/output (I/O) ports 1018, I/O components 1020, a power supply 1022, and a network component 1024. While computing device 1000 is depicted as a seemingly single device, multiple computing devices 1000 may work together and share the depicted device resources. For example, memory 1012 may be distributed across multiple devices, and processor(s) 1014 may be housed with different devices.

Bus 1010 represents what may be one or more busses (such as an address bus, data bus, or a combination thereof). Although the various blocks of FIG. 10 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 10 and the references herein to a "computing device." Memory 1012 may take the form of the computer storage media referenced below and operatively provide storage of computer-readable instructions, data structures, program modules and other data for the computing device 1000. In some examples, memory 1012 stores one or more of an operating system, a universal application platform, or other program modules and program data. Memory 1012 is thus able to store and access data 1012a and instructions 1012b that are executable by processor 1014 and configured to carry out the various operations disclosed herein.

In some examples, memory 1012 includes computer storage media. Memory 1012 may include any quantity of memory associated with or accessible by the computing device 1000. Memory 1012 may be internal to the computing device 1000 (as shown in FIG. 10), external to the computing device 1000 (not shown), or both (not shown). Additionally, or alternatively, the memory 1012 may be distributed across multiple computing devices 1000, for example, in a virtualized environment in which instruction processing is carried out on multiple computing devices 1000. For the purposes of this disclosure, "computer storage media," "computer-storage memory," "memory," and "memory devices" are synonymous terms for the computer-storage memory 1012, and none of these terms include carrier waves or propagating signaling.

Processor(s) 1014 may include any quantity of processing units that read data from various entities, such as memory 1012 or I/O components 1020. Specifically, processor(s) 1014 are programmed to execute computer-executable instructions for implementing aspects of the disclosure. The instructions may be performed by the processor, by multiple processors within the computing device 1000, or by a processor external to the client computing device 1000. In some examples, the processor(s) 1014 are programmed to execute instructions such as those illustrated in the flow charts discussed below and depicted in the accompanying drawings. Moreover, in some examples, the processor(s) 1014 represent an implementation of analog techniques to perform the operations described herein. For example, the operations may be performed by an analog client computing device 1000 and/or a digital client computing device 1000. Presentation component(s) 1016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1000, across a wired connection, or in other ways. I/O ports 1018 allow computing device 1000 to be logically coupled to other devices including I/O components 1020, some of which may be built in. Example I/O components 1020 include, for example but without limitation, a microphone, joystick, game pad, satellite dish, scanner, printer, wireless device, etc.

Computing device 1000 may operate in a networked environment via the network component 1024 using logical connections to one or more remote computers. In some examples, the network component 1024 includes a network interface card and/or computer-executable instructions (e.g., a driver) for operating the network interface card. Communication between the computing device 1000 and other devices may occur using any protocol or mechanism over any wired or wireless connection. In some examples, network component 1024 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1024 communicates over wireless communication link 1026 and/or a wired communication link 1026a to a remote resource 1028 (e.g., a cloud resource) across network 1030. Various different examples of communication links 1026 and 1026a include a wireless connection, a wired connection, and/or a dedicated link, and in some examples, at least a portion is routed through the internet.

Although described in connection with an example computing device 1000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer-readable medium storing instructions that are operative upon execution by the processor to:
      generate a logical graph using a query input;
      for each of a first permutation and a second permutation of data stores, wherein the first permutation and the second permutation are unique orderings of the data stores:
         for each of a first data store and a second data store in the permutation, while the logical graph has not been fully consumed:
            generate a physical plan using a query planning schema; and
            determine whether the logical graph has been fully consumed; and
         determine a query cost for the permutation;
      using the query cost of the first permutation and the second permutation, select a selected physical plan; and
      execute a query using the selected physical plan across the first data store and the second data store.

2. The system of claim 1, wherein the instructions are further operative to:
   limit a third permutation from consideration using a machine-learning (ML) model.

3. The system of claim 1, wherein the query cost comprises at least one cost or a weighted combination of costs selected from a list consisting of:
   freshness, latency, power consumption, environmental impact, energy efficiency, monetary cost, network cost, a count of different data stores used.

4. The system of claim 3, wherein the instructions are further operative to:
   using elapsed time since receiving the query input, adjust the weighted combination of costs while the query is pending.

5. The system of claim 3, wherein the instructions are further operative to:
   determine the combination weighting of the weighted combination of costs using a machine learning (ML) model.

6. The system of claim 1, wherein generating the physical plan further comprises:
   instantiating new nodes of the logical graph and loading required properties;
   instantiating new relationships of the logical graph and loading required properties;
   instantiating existing nodes of the logical graph and loading required properties;

determining that the data store can contribute progress to consumption of the logical graph based on a new loaded property;
integrating node or relationship creation in the physical plan; and
marking a related note, relationship, property, or predicate, as consumed.

7. The system of claim 1, wherein the query planning schema comprises at least one sub-schema selected from a list consisting of:
a node sub-schema, a relationship sub-schema, a property sub-schema, a data store sub-schema, a principal identifier sub-schema, and a reference identifier sub-schema.

8. A method of performing federated graph queries across multiple data stores, the method comprising:
generating a logical graph using a query input;
for each of a first permutation and a second permutation of data stores, wherein the first permutation and the second permutation are unique orderings of the data stores:
for each of a first data store and a second data store in the permutation, while the logical graph has not been fully consumed:
generating a physical plan using a query planning schema; and
determining whether the logical graph has been fully consumed; and
determining a query cost for the permutation;
using the query cost of the first permutation and the second permutation, selecting a selected physical plan;
executing a query using the selected physical plan across the first data store and the second data store; and
returning results of the query.

9. The method of claim 8, further comprising:
limiting a third permutation from consideration using a machine-learning (ML) model.

10. The method of claim 8, wherein the query cost comprises at least one cost or a weighted combination of costs selected from the a consisting of:
freshness, latency, power consumption, environmental impact, energy efficiency, monetary cost, network cost, a count of different data stores used.

11. The method of claim 10, further comprising:
using elapsed time since receiving the query input, adjusting the weighted combination of costs while the query is pending.

12. The method of claim 10, further comprising:
determining the combination weighting of the weighted combination of costs using a machine learning (ML) model.

13. The method of claim 8, wherein generating the physical plan further comprises:
instantiating new nodes of the logical graph and loading required properties;
instantiating new relationships of the logical graph and loading required properties; and
instantiating existing nodes of the logical graph and loading required properties;
determining that the data store can contribute progress to consumption of the logical graph based on a new loaded property;
integrating node or relationship creation in the physical plan; and
marking a related note, relationship, property, or predicate, as consumed.

14. The method of claim 8, wherein the query planning schema comprises at least one sub-schema selected from a list consisting of:
a node sub-schema, a relationship sub-schema, a property sub-schema, a data store sub-schema, a principal identifier sub-schema, and a reference identifier sub-schema.

15. One or more computer storage devices having computer-executable instructions stored thereon, which, on execution by a computer, cause the computer to perform operations comprising:
receiving a query input;
generating a logical graph using the query input;
for each of a first permutation and a second permutation of data stores, wherein the first permutation and the second permutation are unique orderings of the data stores:
for each of a first data store and a second data store in the permutation, while the logical graph has not been fully consumed:
generating a physical plan using a query planning schema; and
determining whether the logical graph has been fully consumed; and
determining a query cost for the permutation;
using the query cost of the first permutation and the second permutation, selecting a selected physical plan; and
executing a query using the selected physical plan across the first data store and the second data store.

16. The one or more computer storage devices of claim 15, wherein the instructions cause the computer to perform further operations comprising:
limiting a third permutation from consideration using a machine-learning (ML) model.

17. The one or more computer storage devices of claim 15, wherein the query cost comprises at least one cost or a weighted combination of costs selected from a list consisting of:
freshness, latency, power consumption, environmental impact, energy efficiency, monetary cost, network cost, a count of different data stores used.

18. The one or more computer storage devices of claim 15, wherein generating the physical plan further comprises:
instantiating new nodes of the logical graph and loading required properties;
instantiating new relationships of the logical graph and loading required properties; and
instantiating existing nodes of the logical graph and loading required properties;
determining that the data store can contribute progress to consumption of the logical graph based on a new loaded property;
integrating node or relationship creation in the physical plan; and
marking a related note, relationship, property, or predicate, as consumed.

19. The one or more computer storage devices of claim 15, wherein the query planning schema comprises at least one sub-schema selected from a list consisting of:
a node sub-schema, a relationship sub-schema, a property sub-schema, a data store sub-schema, a principal identifier sub-schema, and a reference identifier sub-schema.

20. The one or more computer storage devices of claim 15, wherein the logical graph comprises a set of predicates calculated from the query input.

* * * * *